(12) United States Patent
Lambrecht et al.

(10) Patent No.: US 7,683,692 B2
(45) Date of Patent: Mar. 23, 2010

(54) BUS CIRCUIT

(75) Inventors: Xavier Lambrecht, Romsee (BE);
Bernardus Adrianus Cornelis Van Vlimmeren, Veldhoven (NL)

(73) Assignee: ST-Ericsson SA, Geneva (CH)

( * ) Notice: Subject to any disclaimer, the term of this patent is extended or adjusted under 35 U.S.C. 154(b) by 0 days.

(21) Appl. No.: 12/067,485

(22) PCT Filed: Sep. 21, 2006

(86) PCT No.: PCT/IB2006/053249

§ 371 (c)(1),
(2), (4) Date: Oct. 31, 2008

(87) PCT Pub. No.: WO2007/034368

PCT Pub. Date: Mar. 29, 2007

(65) Prior Publication Data

US 2009/0085631 A1      Apr. 2, 2009

(30) Foreign Application Priority Data

Sep. 21, 2005    (EP) .................................. 05108725

(51) Int. Cl.
*H03K 3/00* (2006.01)
(52) U.S. Cl. ...................................... 327/299; 713/300
(58) Field of Classification Search .................. 327/299; 455/424; 713/300
See application file for complete search history.

(56) References Cited

U.S. PATENT DOCUMENTS

| | | | | |
|---|---|---|---|---|
| 5,317,693 A | * | 5/1994 | Cuenod et al. .................. | 710/9 |
| 5,377,189 A | * | 12/1994 | Clark .......................... | 370/462 |
| 5,455,916 A | * | 10/1995 | Bourke et al. ................ | 710/105 |
| 5,555,381 A | * | 9/1996 | Ludwig et al. ............... | 710/300 |
| 5,732,225 A | * | 3/1998 | Miller et al. ................. | 710/107 |

(Continued)

FOREIGN PATENT DOCUMENTS

EP     0051332 A1     5/1982

*Primary Examiner*—Lincoln Donovan
*Assistant Examiner*—Adam D Houston

(57) ABSTRACT

Clock control is handed over in a bus circuit from a first circuit (14) to a second circuit (12). A clock conductor (10a) is driven to a predetermined voltage level with the driver circuit of the first circuit after a last clock period following the start of execution of the handover command and to continue driving the clock conductor (10a) to the predetermined voltage level for a first time-interval. The clock conductor (10a) is driven to the predetermined voltage level with the driver circuit of the second circuit after a second time interval following the start of execution of the handover command until a third time interval has elapsed following the end of the second time interval. Subsequently the clock conductor (10a) is driven under control of the clock circuit (140) of the second circuit (14). The first time interval contains a first integer number P1 of periods of a first clock signal of the first circuit and the second and third time interval contain a second and third integer number P2, P3 of periods of a second clock signal of the second circuit, a duration corresponding to the second integer number P2 equaling at least a pulse duration of the first clock signal, a duration corresponding to the first integer number P1 equaling at least a duration corresponding to the second integer number P2 plus one, a duration corresponding to the second plus third integer P2, P3 equaling at least a duration corresponding to the first number P1 plus one.

12 Claims, 3 Drawing Sheets

U.S. PATENT DOCUMENTS

Figure 1:
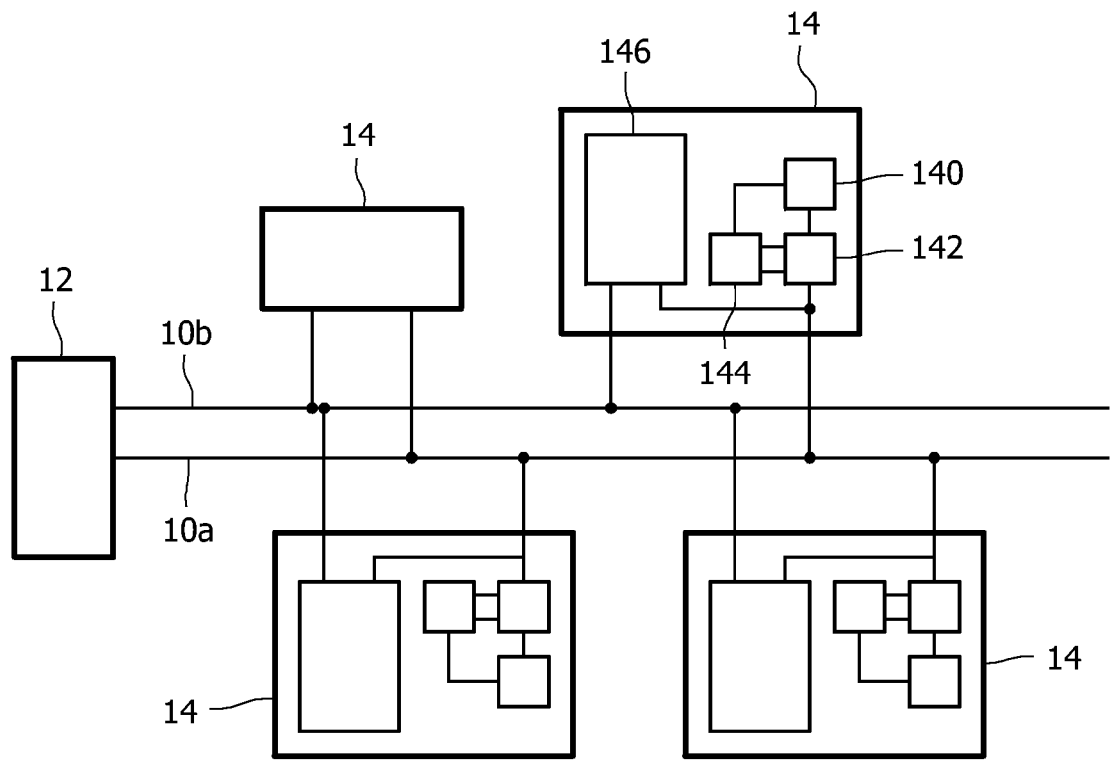

| | | | |
|---|---|---|---|
| 6,418,979 B1 * | 7/2002 | Lewis et al. | 141/4 |
| 6,839,393 B1 * | 1/2005 | Sidiropoulos | 375/371 |
| 7,240,145 B2 * | 7/2007 | Holman | 711/5 |
| 7,365,566 B2 * | 4/2008 | Aoyama et al. | 326/39 |
| 7,466,784 B2 * | 12/2008 | Sidiropoulos | 375/371 |
| 7,489,756 B2 * | 2/2009 | Sidiropoulos | 375/371 |
| 7,548,601 B2 * | 6/2009 | Sidiropoulos | 375/371 |
| 7,570,726 B2 * | 8/2009 | Sidiropoulos | 375/371 |
| 2005/0057292 A1 * | 3/2005 | Sidiropoulos | 327/233 |
| 2009/0045854 A1 * | 2/2009 | Sidiropoulos | 327/144 |
| 2009/0132835 A1 * | 5/2009 | Ehmann | 713/300 |
| 2009/0236909 A1 * | 9/2009 | Aldag et al. | 307/39 |

* cited by examiner

BUS CIRCUIT

The invention relates to an apparatus with a communication bus and to devices and methods for operating such an apparatus.

In portable equipment it is desirable to reduce power consumption as much as possible. In practice this means that, if the apparatus contains multiple circuits that are not always needed together at the same time, it should be possible to power down as much of the circuits as possible, while only the minimum number of necessary circuits keeps functioning.

For example, in a portable sound reproduction device with different sound data source circuits (an MP3 sound data source, a telephone sound data source, a synthetic sound data source) it should preferably be possible to power down all but one active source and the loudspeaker control circuit.

Different circuits in an apparatus can be coupled to each other via a communication bus. Typically a communication bus includes a clock conductor that carries a clock signal to synchronize the actions involved in data transfers. A common clock circuit may be used for all bus circuits. In this case the clock circuit typically has a push pull driver circuit coupled to the clock conductor. However, the need to provide a common clock for a plurality of different applications may significantly increase power consumption. Different bus circuits that require different clock signals need to be adapted for use with the common clock signal. It would be preferable that each bus circuit could drive the clock signal, but in this case driving conflicts may arise between the different bus circuits on the clock conductor.

European Patent application EP 0051332 describes the so-called I2C bus, wherein the clock signals are generated collectively by different active bus circuits. A wired OR circuit is used, wherein a plurality of bus circuits are each able to pull down the bus potential, the bus potential being pushed up by a shared resistance if no bus circuit pulls it down. As a result the potential of the clock conductor becomes low when at least one of the bus-circuits pulls it low and high when none of the bus circuit pulls it down. Thus a clock signal is realized independent of the number of active bus circuits that is coupled to the bus. However, the use of wired logic slows down the circuit and increases power supply consumption.

Among others, it is an object of the invention to provide for an apparatus with a plurality of bus circuits connected by a communication bus, wherein bus clock signals on a clock conductor of the bus can be generated by different ones of the bus circuits.

The invention provides for an apparatus according to claim 1. The apparatus provides for handover of clock control between different circuits that are coupled to the bus. The driver circuits of different clock sources drive the clock conductor of the bus to a predetermined voltage level during time intervals that last for respective predetermined numbers of their respective clock cycles. The number of clock cycles are selected so that the clock conductor does not become floating at any time and no conflicting driving occurs. As a result push-pull driving circuits can be used (not only wired logic circuits). No spurious clock pulses or missing clock pulses occur, which could disrupt operation of the apparatus.

The apparatus is particularly advantageous in the case that bus cycles (frames) with synchronous channels are used to transmit a stream of sample values. In this case a selected part of the clock cycles in a larger cycle is allocated to transmission of sample values to a device like a digital loudspeaker. The isochronous channel that is allocated for an indefinite number of cycles ensures that no hiccups in data transmission can occur due to arbitration losses. The clock handover mechanism ensures that the allocated channel can be continued to be used for supplying sample values without disruption, using a simple mechanism. Alternatively, with a more complicated mechanism, a new channel may be allocated after or before handover, but also in this case the absence of spurious or missing clock pulses ensures that no disruption occurs.

Preferably the circuit that has clock control also supplies data (for example audio sample values) and when a different circuit starts supplying data that different circuit takes over clock control. In an embodiment the start of data supply from a new circuit occurs simultaneously with clock-control handover to that new circuit (or at least in the same frame). Alternatively the start of data supply may take place some frames before or after clock control hand over, so that data and clock signals are temporarily supplied by different circuits.

In an embodiment a ratio between the periods of the clock signals of the different circuit is determined (for example from a table for different combinations of circuits that may be involved in hand-over). In this case the number of clock cycles in the different time intervals is adjusted according to said ratio. Thus handover between different combinations of clock frequencies can be realized.

In an embodiment circuits support a sleep mode and an operating mode. In this case the circuit that has handed over clock control can be switched to its sleep mode after the handover to save power.

These and other objects and advantages of the invention will be illustrated in the following description of exemplary embodiments, using the following Figures.

Figure 2:
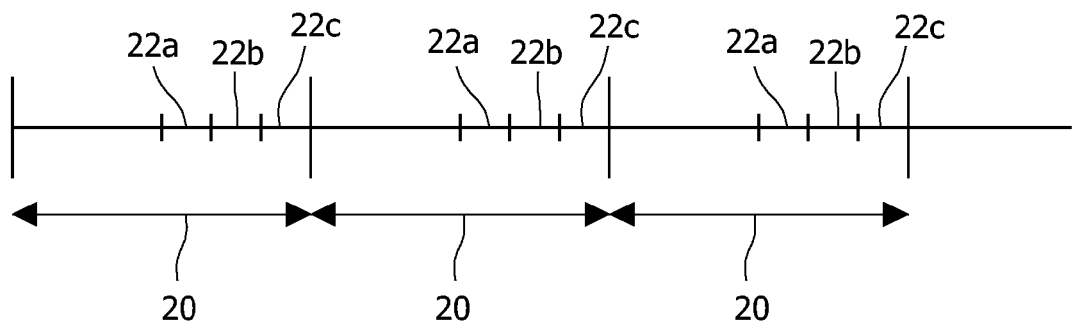
Figure 3:
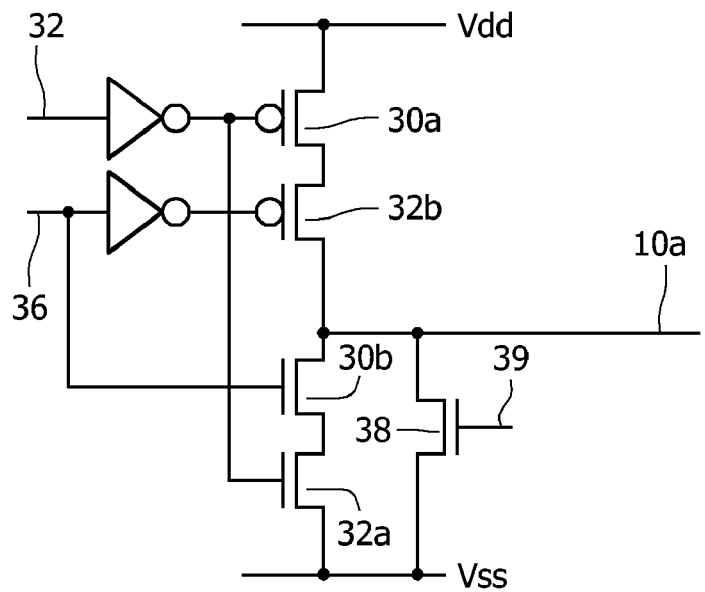
Figure 4:
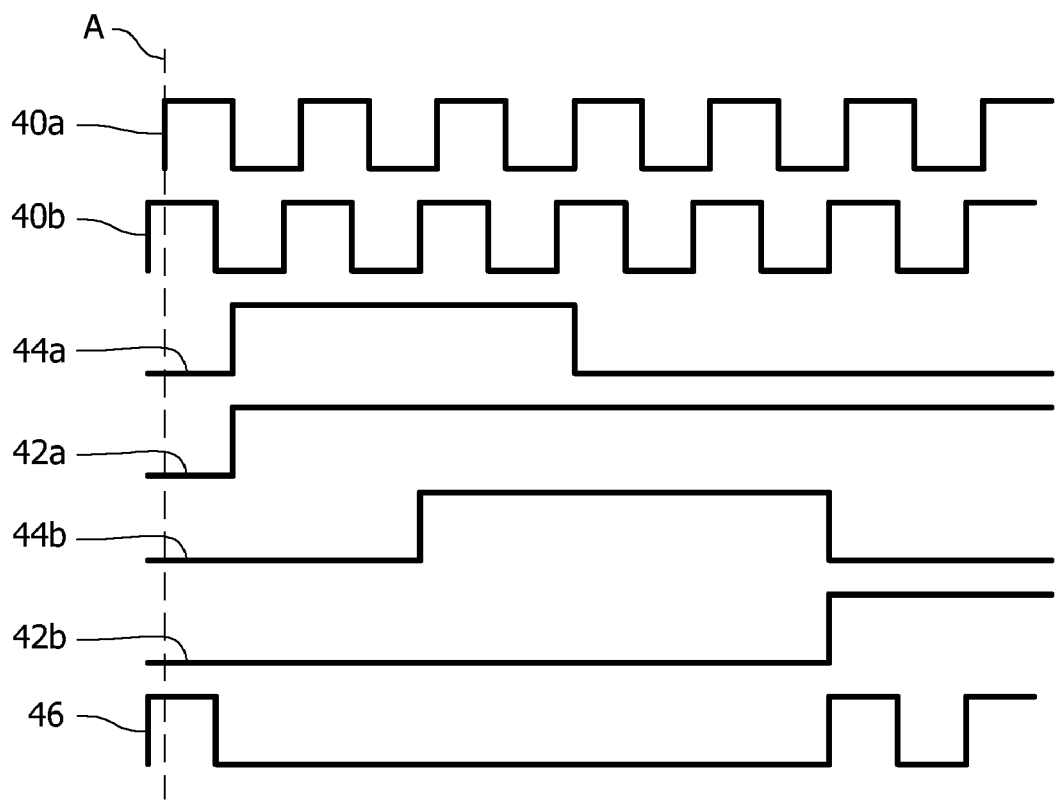
Figure 5:
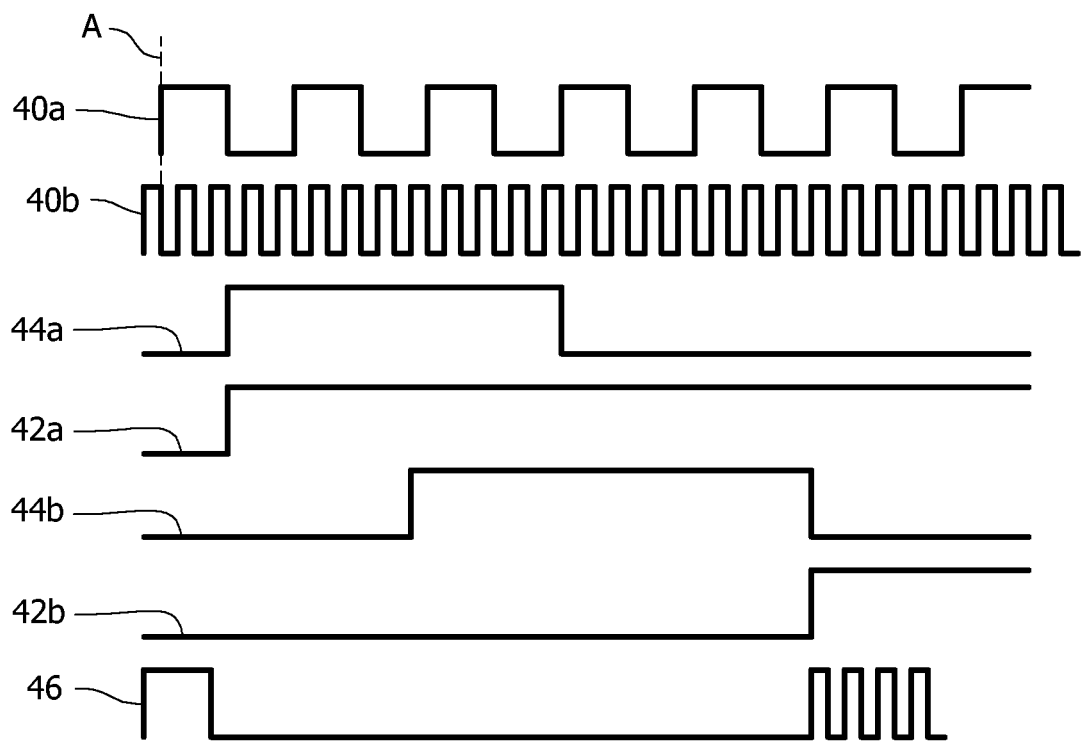
Figure 6:
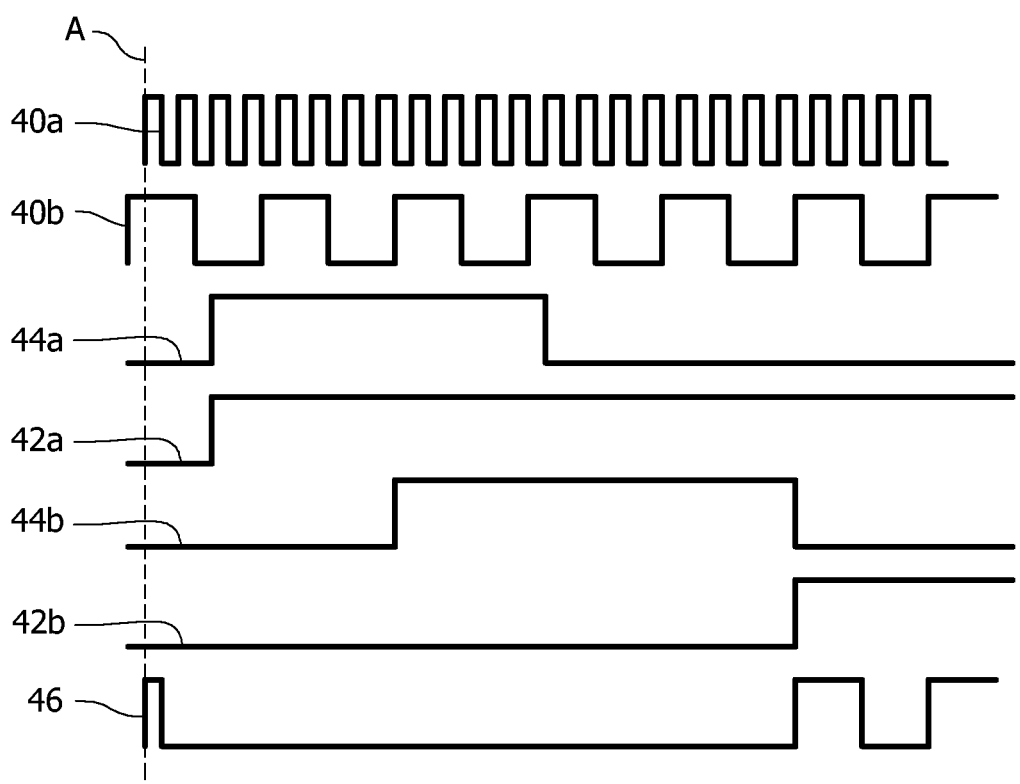

FIG. 1 shows an apparatus with a communication bus
FIG. 2 shows a time cycle with isochronous channels
FIG. 3 shows a push-pull driver circuit
FIGS. 4-6 show bus-handover timing diagram FIG. 1 shows an apparatus with a communication bus 10a,b. Communication bus 10a,b comprises a clock conductor 10a and at least one data conductor 10b. By way of example the apparatus contains a digital loudspeaker device 12 (including for example a bus interface, a DAC, an amplifier and a passive loudspeaker) coupled to bus 10a,b and a plurality of sound data sources 14, such as an MP3 decoder, a telephone reception circuit etc coupled to bus 10a,b. In addition devices other than sound data sources may be coupled to bus 10a,b. At least part of the devices 14 that are coupled to the bus 10a,b are circuits that each comprise their own clock source circuit 140, with an output coupled to a clock driver circuit 142 which has an output coupled to clock conductor 10a. Furthermore, in these devices a clock driver control circuit 144 is provided with an output coupled to the clock driver circuit 142. The clock conductor 10a and the data conductor 10b are coupled to a data processing circuit 146 that supplies or receives data from data conductor 10b under timing control of clock conductor 10a.

Preferably the devices 14 with a clock circuit are arranged so that different clock frequencies may be generated, either by respective devices, or by a same device. The different clock frequencies may be determined for example by different sample frequencies of audio sources. Examples of different clock frequencies that may be used in the same system are 12.288 Mhz, 11.2896 MHz and divided frequencies thereof. In an embodiment the devices are arranged to operate in successive cycles (frames) that each contain a plurality of clock pulses.

FIG. 2 shows repeating cycles (frames) 20 and isochronous channels 22a-c within cycles 20. Each isochronous channel 22a-c contains one or more clock cycles at a respective offset to the start of cycle 20. Different offsets each are characteristic for a respective channel (preferably the offset for each particular channel is the same in each cycle). The isochronous channels 22a-c are provided to pass respective streams of real-time data. For example, one isochronous channel may be used to supply a stream of audio sample values to loudspeaker 12. Other isochronous channels are optional, but may include a channel for passing a stream of data from an external serial interface device 14, for example. Preferably the sample values are supplied without any encapsulation, the position of data in the cycle indicating that the data is a sample value intended for a device (e.g. loudspeaker 12) associated with the isochronous channel.

Typically, an asynchronous channel is allocated to a stream. Allocation may be permanent (e.g. in the case of a stream directed at a loudspeaker device 12) or it may be established in response to a request command for allocation of an isochronous channel. Preferably an isochronous channel is associated with a target device, such as loudspeaker device 12. In this case the source device that supplies data as part of the stream in the isochronous channel may be changed without changing the isochronous channel. Thus, one device 15 may take over the supply of samples of a stream in an isochronous channel for a loudspeaker device from another device from one cycle to the next without interruption. Alternatively, take-over requires de-allocation of a channel and allocation of a new channel, but this requires more precautions to prevent disturbance of the stream.

The devices 14 that are coupled to the bus 10a,b that have their own clock source can each take over push-pull driving of clock conductor 10a. Preferably a device that is the source of a stream in the isochronous channel is also the source of the clock signals. When one device takes over as source of the stream from another, preferably the clock source function is also taken over. This makes it possible to switch the devices to a sleep mode when thy do not act as source of the stream.

FIG. 3 shows an example of a push-pull driver circuit coupled to clock conductor 10a. The push-pull driver circuit receives power from power supply connections Vss, Vdd for different supply voltages (e.g. ground and a positive voltage with respect to ground). Driver transistors 30a, b have main current channels coupled between the power supply connections Vss, Vdd and the clock conductor 10a respectively. Control electrodes (gates) of driver transistors 30a, b are coupled to an input 32 for receiving a clock signal. Enable transistors 34a,b have main current channels coupled in series with those of driver transistors 30a,b, between the power supply connections Vss, Vdd and the clock conductor 10a respectively. Control electrodes (gates) of enable transistors 30a, b are coupled to an input 36 for receiving an enable signal. In addition a transition pull down transistor 38 is provided with a main current channel coupled between one power supply connection and clock conductor 10a, coupled in parallel with the series arrangement of one of the driver transistors 30a and enable transistors 30b. Transition pull down transistor 38 has a control electrode coupled to a transition control input 39 coupled to the driver control circuit (not shown). It should be emphasized that this circuit is merely an example. As an alternative, for example only a single transistor current channel may be provided between the clock signal conductor 10a and a power supply, with a logic circuit coupled to its gate to make this transistor conductive dependent on the clock signal, the enable signal and the transition control signal.

A clock hand-over takes place when a hand-over command is transmitted via bus 10, for example from one of the devices 14 that acts as a central controller, or from a device that has received a command to become active. The hand-over command is transmitted for example in a part of the cycle that is not allocated to a synchronous channel, or in a synchronous channel that is dedicated to command transfer. In response to the hand-over command a first device 14 that previously drove clock signals on the bus switches to a disabled state and a second device 14 that is the new clock master associated with the handover command starts driving clock signals. Preferably, hand-over starts at the beginning of a clock cycle of the clock signal on clock conductor 10a at a predetermined point in the cycle, for example at the start of the cycle immediately after the cycle wherein the hand-over command was received. Preferably the beginning of the cycle is indicated by a sync data pattern that is transmitted over 10b data conductor by a bus host device (which can be any device 14, e.g. the first device, the second device 14 or any other device). Once the sync data pattern has been detected by the first and second device handover starts.

FIG. 4 shows signals during clock handover when the clock frequencies are at least approximately the same, but the clock signals may have different phase. Internal clock signals 40a, 40b of the first and second device are shown, as well as enable signals 42a,b and transition control signals 44a,b. Finally the resulting clock signal 46 on clock conductor 10a is shown.

The driver circuit of the first device drives the clock conductor to a predetermined voltage level after a last clock period following the start of execution of the handover command and to continue driving the clock conductor to the predetermined voltage level for a first time-interval. The second device starts driving the clock conductor to the predetermined voltage level after a second time interval following the start of execution of the handover command until a third time interval has elapsed following the end of the second time interval, and subsequently to drive the clock conductor under control of the clock circuit of the second device. The first time interval contains a first integer number P1 of periods of a first clock signal of the first device and the second and third time interval contain a second and third integer number P2, P3 of periods of a second clock signal of the second device, a duration corresponding to the second integer number P2 equaling at least a pulse duration of the first clock signal, a duration corresponding to the first integer number P1 equaling at least a duration corresponding to the second integer number P2 plus one, a duration corresponding to the second plus third integer P2, P3 equaling at least a duration corresponding to the first number P1 plus one.

The time point of the start of handover is indicated by A (e.g. the start of a cycle, or completion of the sync pattern). After the high phase of the first clock cycle of the first device 13 after time point A the first device 14 sets the enable signal 42a low (disabling its driver circuit) and raises its transition control signal 44a to make its transition pull-down transistor conductive. The first device 14 keeps the transition control signal 44a high for the remaining part of the first clock cycle and two additional ones of its clock cycles. After that the transition control signal 44a is returned low.

The second device 14 detects the time point A of handover (e.g. by detecting the sync pattern). Subsequently the second device 14 waits a full one of its own clock cycles after time point A. After this clock cycle second device 14 sets its transition control signal 44b high to make its transition pull-down transistor conductive for three of its clock cycles. Subsequently the second device 14 raises its enable signal to enable its driver circuit, the transition control signal being lowered. In this way conflicting driving conditions on clock conductor 10a are avoided.

The clock signal conductor is always actively driven, but during handover it is driven low partly by both devices that are involved in the handover. The number of clock cycles P1=2 (plus the remainder of the first clock cycle) before the first device stops pulling clock conductor 10a low, the number of clock cycles P2=1 before the second device starts pulling clock conductor 10a low and the number of clock cycles P3=3 before the second device starts a high pulse on clock conductor 10a are selected so that there is an overlap of the time periods in which clock conductor 10a is pulled low and it is ensured that no conflicting driving conditions will arise. In an alternative embodiment no delays are observed to ensure the overlap of pull-low. This has the disadvantage that a high impedance state may arise temporarily on the bus, with potential spurious clock pulses.

When the apparatus supports devices with a plurality of frequencies the hand-over preferably involves a factor N to multiply the number of clock cycles P1 and a factor M to multiply the number of clock cycles P2, P3 dependent on a ratio between the clock periods. In a first embodiment a bus manager device 14 maintains a table of predetermined factors N, M for handover between respective pairs of devices 14, given the nominal frequencies of these devices (or the nominal clock frequencies to which the devices are set). Preferably, information indicative of these factors is supplied to the first and second device in the handover command and used by the devices in the handover to control the periods P1, P2, P3. Alternatively, each device 14 itself may be provided with a table of factors N, M for handovers to and from other devices 14 (or devices set to respective frequencies) and the device may be arranged to set to set the periods accordingly. In yet another embodiment each device 14 or a bus manager measures the actual frequencies used on the bus and selects the factors accordingly.

FIG. 5 shows a handover when the first device 14 has a significantly lower clock frequency than the second device 14. The handover is similar to that of FIG. 4, except that the second device waits for N of it clock cycles before setting its transition control signal 44b high to make its transition pull-down transistor conductive, and subsequently keeps the transition control signal 44b high for 3N of its clock cycles. N is selected so that the second device 14 drive down clock conductor 10a before first device stops driving down clock conductor 10a, that is $N*Thigh<3\ Tlow$ (Herein Thigh and Tlow are the clock periods of the fast and slow clock respectively). Furthermore N should be selected so that the second device does not start pulling down clock conductor 10a before the end of the high pulse from the first device after time point A:

$N*Thigh>Tlow/2$

Finally N should be selected so that the second device 14 does not start pulling up clock conductor 10a before the first device stops pulling clock conductor 10a down:

$4*N*Thigh>3\ Tlow$

These conditions are satisfied if $\tfrac{3}{4}\ Tlow/Thigh+1<N<3\ Tlow/Thigh-1$ FIG. 6 shows a handover when the first device 14 has a significantly higher clock frequency than the second device 14. The handover is similar to that of FIG. 4, except that the first device waits for 2*M of it clock cycles after its initial high pulse after time point A. To ensure handover without conflicting driving conditions and no time period a floating clock conductor, conditions similar to those for the preceding Figure must be imposed. M has to meet the following conditions:

$(2M+1)*Thigh>2*Tlow$ and $(2*M+1)*Thigh<3*Tlow$

As will be appreciated the apparatus provides for handover of clock driving between different devices without causing missing or spurious clock pulses. This means that all devices can continue to receive data after the handover without having to reboot or reset. In this way a continuing stream of sample values can be supplied in the isochronous channels. Hiccups or glitches are avoided, so that loudspeaker 12 for example produces a smooth sound even during handover.

Once the clock control has been handed over the device 14 that has handed over clock driving may be switched to a sleep mode, e.g. a mode wherein no clock signal is generated internally and/or no clock signal is supplied to at least part of its internal circuits. For this purpose an internal clock enable circuit may be used in the device. Preferably a command to switch to the sleep mode is supplied to the device after handover, or the hand-over command may be an implicit command to do so. In this way power consumption can be reduced.

Similarly, the device that takes over clock driving may be switched from its sleep mode to an operating mode, activating and supplying its clock to internal circuits before handover.

Although a bus 10 with a single data conductor 10b has been shown, it should be understood that alternatively a larger number of data conductors may be used in parallel. As another alternative differential pairs of data or clock conductors may be used. Although a simple push-pull driving circuit has been shown, it should be appreciated that more complicated driving circuits may be used. As an alternative, when a differential clock pair of clock conductors is used a differential driving circuit may be used. As another alternative a wired logic driving circuit with a pull-up resistance connected thereto may be used, although is should be understood that a circuit is preferred that always drives the clock conductor.

The control circuits may be realized for example as dedicated circuits, containing for example counters for counting the required numbers of clock pulses to realized the time intervals. Alternatively, clock control may be realized by means of a programmable circuit, which executes a program to implement the clock control.

Although the invention has been described with devices that each contain there own clock control circuit, it should be appreciated that alternatively a central clock control circuit may be used to trigger counters (not shown) for the different devices to count the required periods. Furthermore, although an embodiment has been shown where the clock conductor 10a is pulled low during the transition it should be appreciated that alternatively the clock signal may be pulled high.

The invention claimed is:

1. An apparatus comprising:
   a communication bus that comprises a clock conductor
   a first and second circuit coupled to the bus, each comprising a clock circuit and a driver circuit with an input coupled to the clock circuit and an output coupled to the clock conductor;
   at least one control circuit arranged to be responsive to a hand-over command from the communication bus for handing over clock control from the first circuit to the second circuit, the control circuit or circuits being arranged to cause the driver circuit of the first circuit to drive the clock conductor to a predetermined voltage level after a last clock period following the start of execution of the handover command and to continue driving the clock conductor to the predetermined voltage level for a first time-interval;

cause the second circuit to start driving the clock conductor to the predetermined voltage level after a second time interval following the start of execution of the handover command until a third time interval has elapsed following the end of the second time interval, and subsequently to drive the clock conductor under control of the clock circuit of the second circuit;

wherein the first time interval contains a first integer number P1 of periods of a first clock signal of the first circuit and the second and third time interval contain a second and third integer number P2, P3 of periods of a second clock signal of the second circuit, a duration corresponding to the second integer number P2 equaling at least a pulse duration of the first clock signal, a duration corresponding to the first integer number P1 equaling at least a duration corresponding to the second integer number P2 plus one, a duration corresponding to the second plus third integer P2, P3 equaling at least a duration corresponding to the first number P1 plus one.

2. An apparatus according to claim 1, wherein the at least one control circuit is arranged to determine a ratio between the periods of the first and second clock signal and to adjust the first number P1 or the second and third number P2, P3 according to said ratio, when said ratio is less than one or greater than one respectively.

3. An apparatus according to claim 2, wherein the at least one control circuit is arranged to set the second integer number to at least three times said ratio when said ratio is greater than one and to set the first number to one and the third integer number to three times the second integer number.

4. An apparatus according to claim 2, wherein the at least one control circuit is arranged to set the first integer number to at least the inverse of said ratio when said ratio is less than one and to set the second and third integer number to one and three respectively.

5. An apparatus according to claim 1, wherein the periods of the first and second clock signal are equal and the first, second and third integer numbers P1, P2, P3 are two, one and three respectively.

6. An apparatus according to claim 1, comprising a receiving device coupled to the communication bus and arranged to derive sample values from data transmitted in isochronous time slots, each isochronous time slot starting after a predetermined number of clock pulses following starting points of frames of each a plurality of clock cycles on said clock conductor.

7. An apparatus according to claim 6, wherein the receiving device is a loudspeaker unit and the sample values are audio values for rendering by the loudspeaker unit.

8. An apparatus according to claim 7, wherein the first and second circuit are both audio sources, arranged to supply sample values to the loudspeaker unit in said isochronous time slots.

9. An apparatus according to claim 1, wherein the second circuit supports a sleep mode and an operating mode, the apparatus being arranged to switch to switch the second circuit from its sleep mode to the operating mode after or at the start of execution of the handover command.

10. An apparatus according to claim 1, comprising a third circuit coupled to the communication bus, the third circuit being arranged to receive data via the communication bus from both the first and second circuit successively.

11. An apparatus according to claim 1, wherein the at least one control circuit is arranged to trigger the start of execution of the handover command upon detection of a frame sync signal from the communication bus following the handover command.

12. A method of operating an apparatus that comprises a communication bus that comprises a clock conductor the method comprising handing over clock control from a first circuit to a second circuit, the method comprising:

driving the clock conductor to a predetermined voltage level with the driver circuit of the first circuit after a last clock period following the start of execution of the handover command and to continue driving the clock conductor to the predetermined voltage level for a first time-interval;

driving the clock conductor to the predetermined voltage level with the driver circuit of the second circuit after a second time interval following the start of execution of the handover command until a third time interval has elapsed following the end of the second time interval, subsequently to drive the clock conductor under control of the clock circuit of the second circuit, wherein the first time interval contains a first integer number P1 of periods of a first clock signal of the first circuit and the second and third time interval contain a second and third integer number P2, P3 of periods of a second clock signal of the second circuit, a duration corresponding to the second integer number P2 equaling at least a pulse duration of the first clock signal, a duration corresponding to the first integer number P1 equaling at least a duration corresponding to the second integer number P2 plus one, a duration corresponding to the second plus third integer P2, P3 equaling at least a duration corresponding to the first number P1 plus one.

* * * * *

UNITED STATES PATENT AND TRADEMARK OFFICE
CERTIFICATE OF CORRECTION

PATENT NO. : 7,683,692 B2
APPLICATION NO. : 12/067485
DATED : March 23, 2010
INVENTOR(S) : Lambrecht et al.

It is certified that error appears in the above-identified patent and that said Letters Patent is hereby corrected as shown below:

In The Specification

In Column 6, Line 41, delete "is should" and insert -- it should --, therefor.

In Column 6, Line 45, delete "to realized" and insert -- to realize --, therefor.

In Column 6, Line 50, delete "there own" and insert -- their own --, therefor.

In The Claims

In Column 6, Line 61, in Claim 1, delete "conductor" and insert -- conductor; --, therefor.

In Column 8, Line 11, in Claim 9, delete "to switch to switch" and insert -- to switch --, therefor.

In Column 8, Line 24, in Claim 12, delete "conductor" and insert -- conductor, --, therefor.

Signed and Sealed this
Twenty-sixth Day of April, 2016

Michelle K. Lee
*Director of the United States Patent and Trademark Office*